No. 675,353. Patented May 28, 1901.
W. M. HOFFMAN.
ROTARY ENGINE.
(Application filed May 21, 1900.)
(No Model.) 6 Sheets—Sheet 1.

Witnesses:
Chas. E. Wisner
May E. Hott

Inventor
William M. Hoffman
By Parker & Burton
Attorneys

THE NORRIS PETERS CO., PHOTO-LITHO., WASHINGTON, D. C.

No. 675,353. Patented May 28, 1901.
W. M. HOFFMAN.
ROTARY ENGINE.
(Application filed May 21, 1900.)
(No Model.) 6 Sheets—Sheet 4.

Witnesses:
Chas. E. Wiener
May E. Nott.

Inventor
William M. Hoffman
By Parker + Burton
Attorneys

No. 675,353. Patented May 28, 1901.
W. M. HOFFMAN.
ROTARY ENGINE.
(Application filed May 21, 1900.)

(No Model.) 6 Sheets—Sheet 5.

Witnesses:
Chas. E. Wiser
May E. Kott

Inventor
William M. Hoffman
By Parker & Burton
Attorneys

No. 675,353. Patented May 28, 1901.
W. M. HOFFMAN.
ROTARY ENGINE.
(Application filed May 21, 1900.)
(No Model.) 6 Sheets—Sheet 6.

Witnesses:
Chas. E. Wisner
May E. Kott.

Inventor,
William M. Hoffman
By Parker & Burton
Attorneys

UNITED STATES PATENT OFFICE.

WILLIAM M. HOFFMAN, OF DETROIT, MICHIGAN.

ROTARY ENGINE.

SPECIFICATION forming part of Letters Patent No. 675,353, dated May 28, 1901.

Application filed May 21, 1900. Serial No. 17,394. (No model.)

*To all whom it may concern:*

Be it known that I, WILLIAM M. HOFFMAN, a citizen of the United States, residing at Detroit, county of Wayne, State of Michigan, have invented a certain new and useful Improvement in Rotary Engines; and I declare the following to be a full, clear, and exact description of the invention, such as will enable others skilled in the art to which it pertains to make and use the same, reference being had to the accompanying drawings, which form a part of this specification.

This invention relates to rotary engines, and has for its object improvements in that class of engines in which the piston travels in an annular cylinder by pressure of steam or other elastic fluid which is introduced into the cylinder behind the traveling piston and in front of an abutment which is arranged to rotate out of the way of the approaching piston and across the annular chamber behind the piston.

The improvements relate to the construction of the engine and the improved means of packing the valves and piston.

Figure 1:
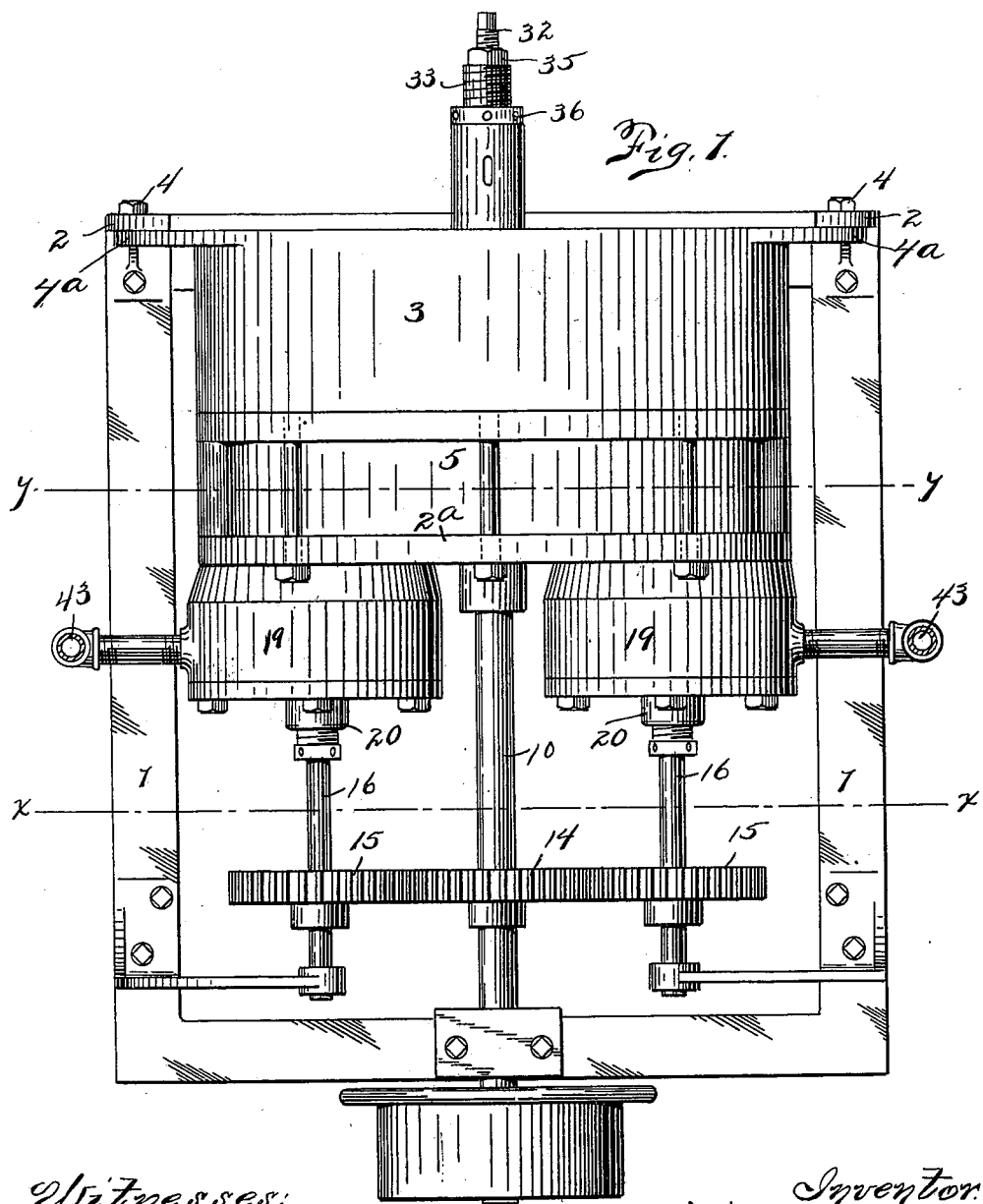
Figure 2:
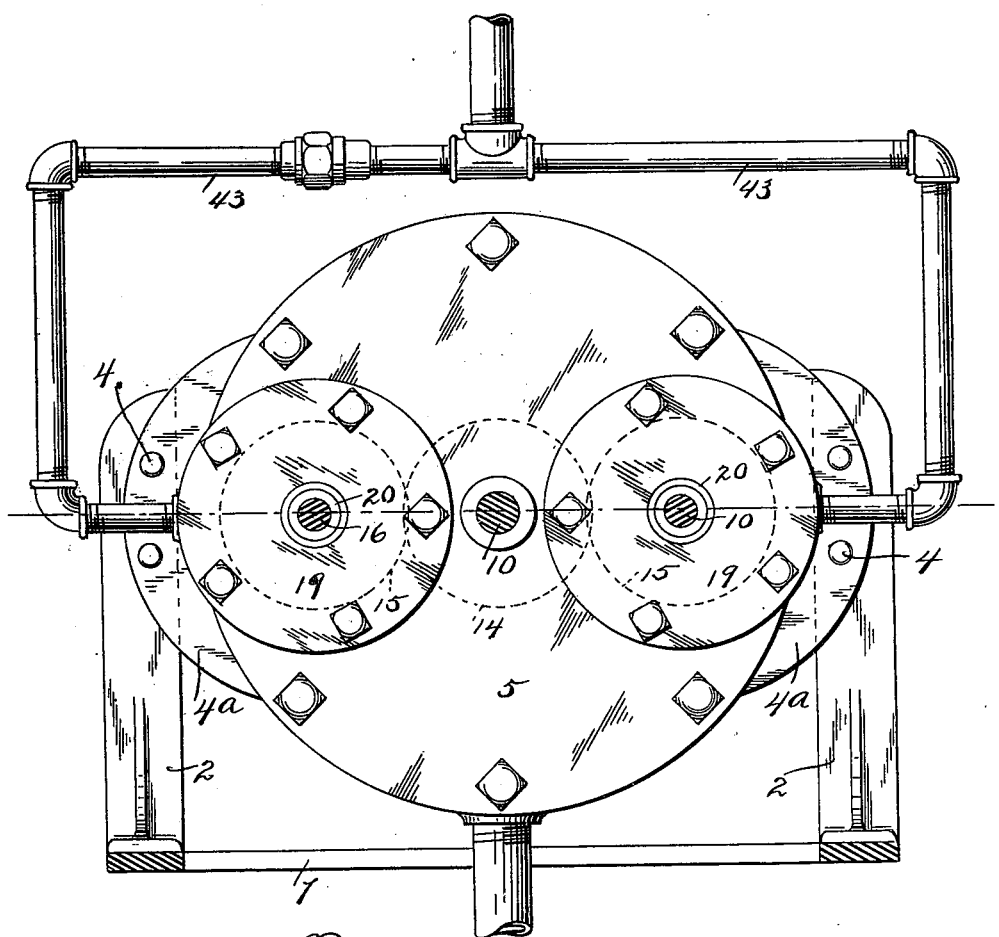
Figure 3:
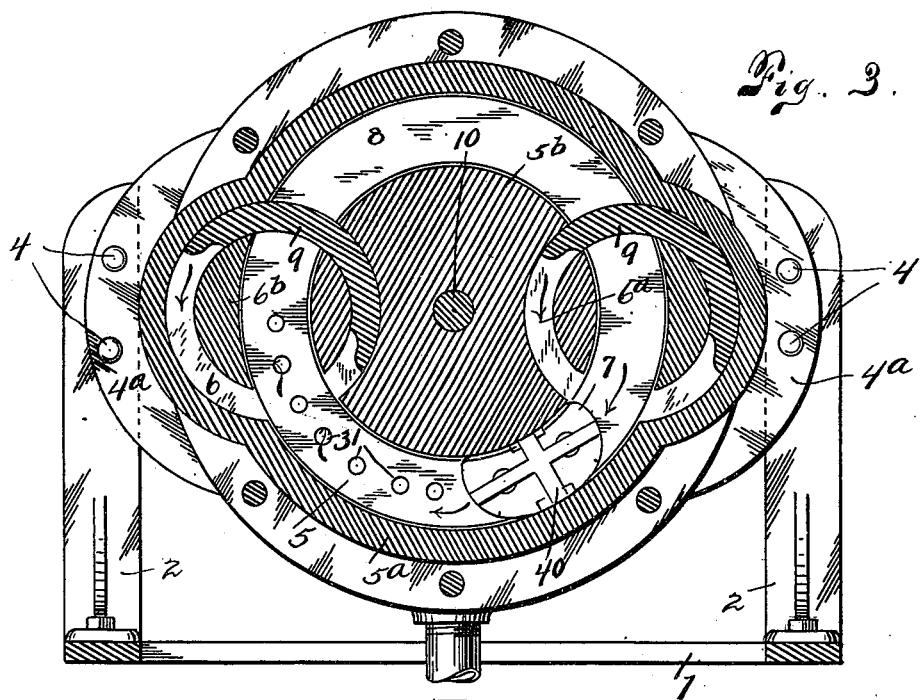
Figure 4:
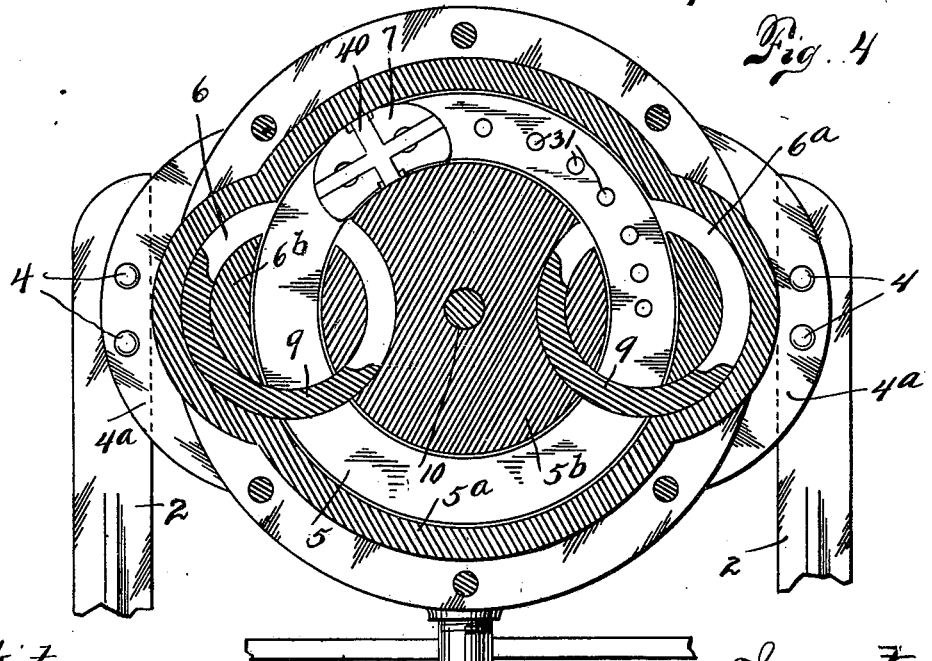
Figure 5:
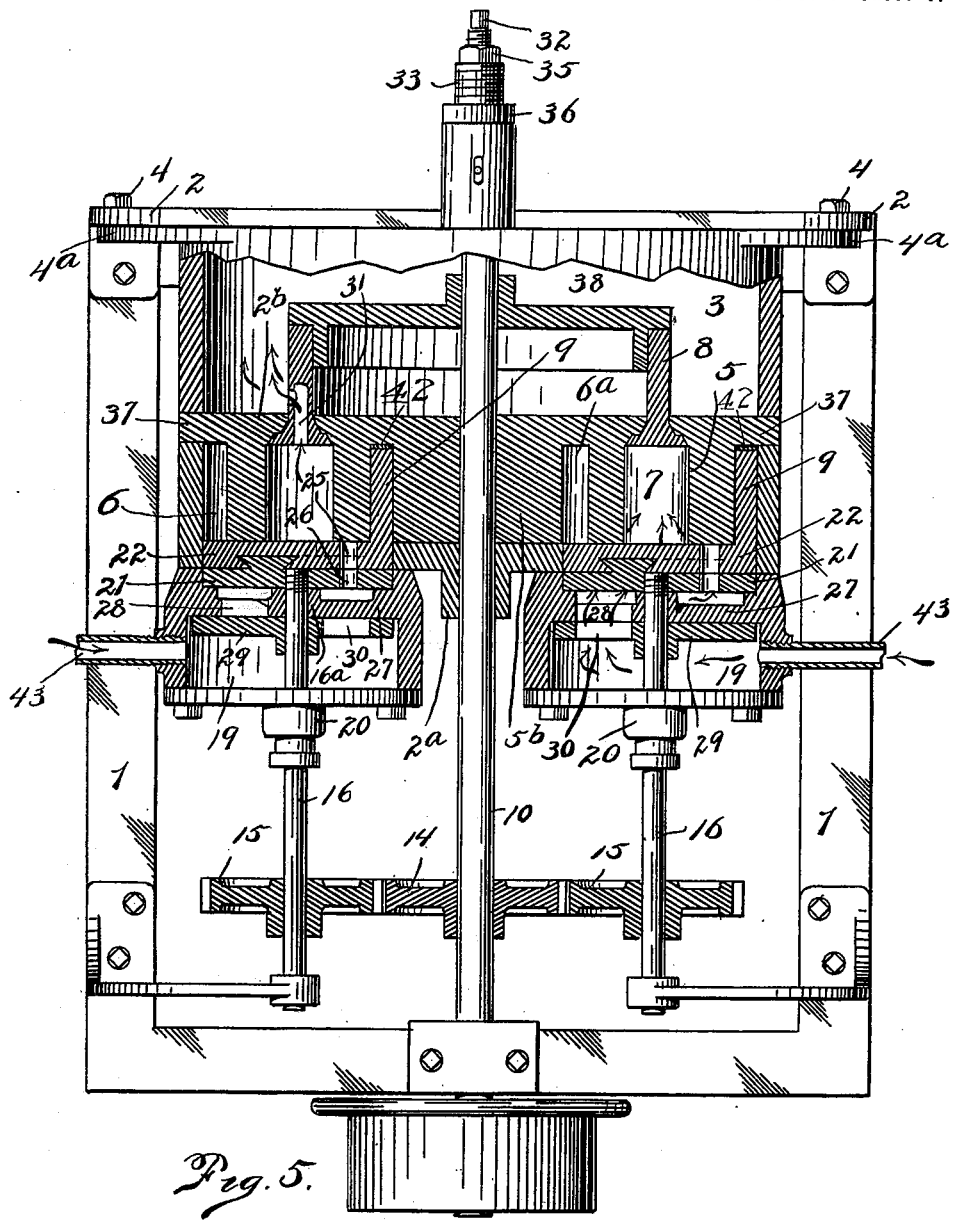
Figure 6:
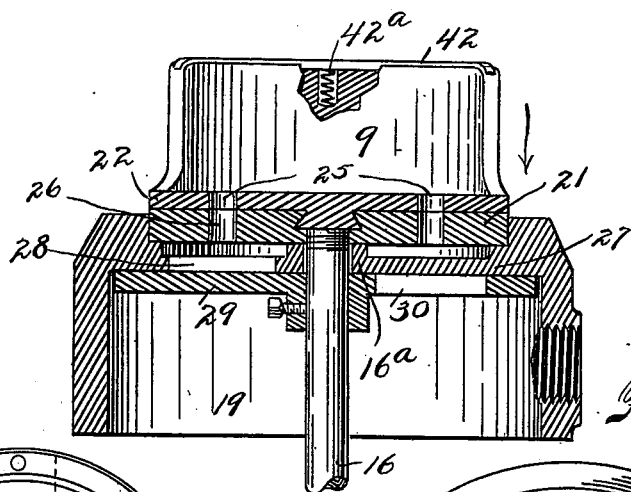
Figure 7:
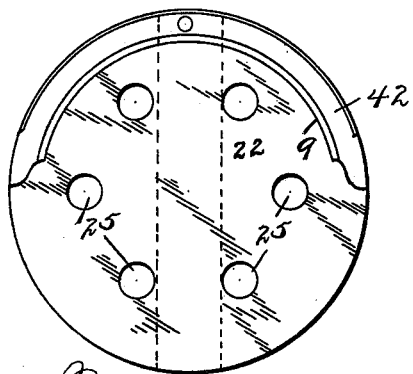
Figure 9:
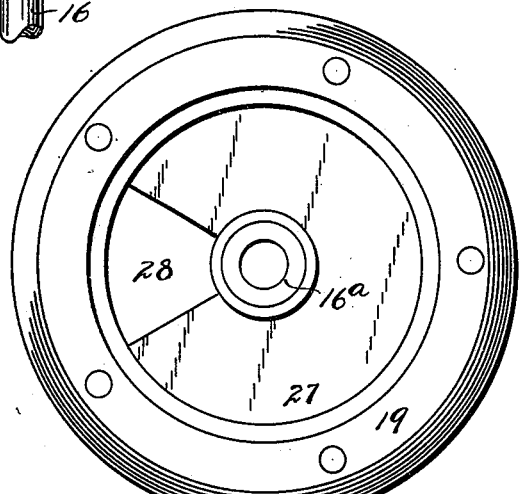
Figure 8:
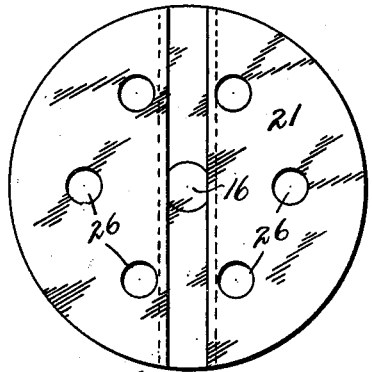
Figure 10:
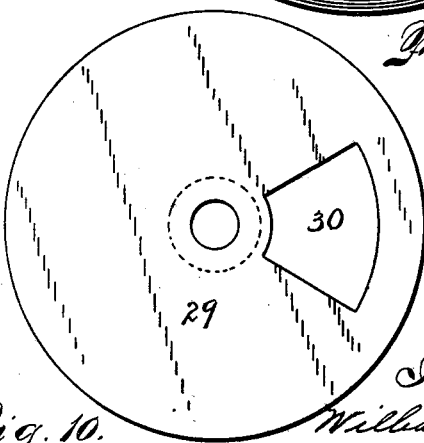
Figure 11:
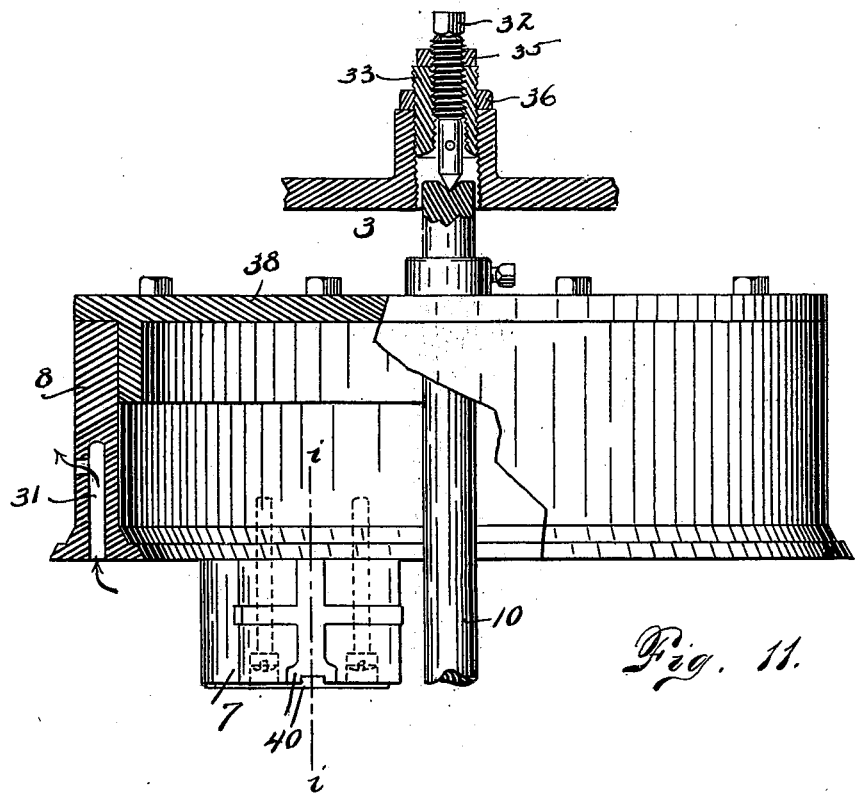
Figure 12:
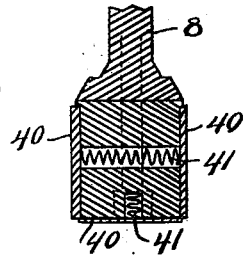

In the drawings, Figure 1 is a plan view of the engine embodying this invention. Fig. 2 is an elevation of the valve-chamber end of the engine. In this view the shafts on which are the valve-driving gear-wheels are cut and that part which is the outside of the line $xx$ of Fig. 1 is removed. Fig. 3 is a sectional elevation through the engine at the line $yy$ of Fig. 1. Fig. 4 is a second sectional elevation along the same line, but with the rotative parts shown in a different position from that shown in Fig. 3. Fig. 5 is a diametrical section lengthwise the shaft of the engine. Fig. 6 is an enlarged detail showing in section one of the steam-chests and valves. Fig. 7 is a detail of the part 22 of Fig. 6. Fig. 8 is an elevation detail of the part 21 of Fig. 6. Fig. 9 is an elevation of the head of the steam-chest 19 of Fig. 6. Fig. 10 is an elevation of the part 29 of Fig. 6. Fig. 11 is a plan view, partly in section, showing the piston-ring, the piston-head, a portion of the engine-casing, and the rear mounting of the main shaft. Fig. 12 is a vertical section of the piston-head at the line $ii$ of Fig. 11.

The bed-plate or frame upon which the engine is mounted is indicated at 1, and upon this bed-plate, which may be of any shape adapted to the place that the engine is to occupy, are standards 2 2, to which the ears $4^a$, projecting from the cylindrical casing 3, are secured by bolts 4. The cylindrical casing 3 is the exhaust-chamber of the engine, and it has bolted to it the engine-cylinder 5. The engine-cylinder 5 is an annular chamber bounded by an external circular wall $5^a$ and by an internal core $5^b$, between which the annular chamber 5 is inclosed. The end parts of the annular chamber are bounded by the casing-plate $2^a$ and on the end by the casing plate or head $2^b$. Through the casing-head $2^b$ is cut an annular slot concentric with the chamber 5, and in the annular slot engages an annular piston-ring 8. The walls of the slot and the walls of that part of the piston-ring which engage in the slot are shaped to furnish a steam-tight joint between the two parts and one in which the pressure of steam in the chamber 5 will tend to hold the parts in contact. For this purpose the face of the ring 8 which lies within the chamber 5 is broadened to reach substantially across the chamber, so that this face of the ring forms substantially an end to the chamber 5. Behind the face the ring 8 is cut with a double-conical surface—a cone on the outside and a hollow cone on the inside—and engages with correspondingly-coned surfaces which bound the slot through the plate $2^b$. The ring 8 is bored with holes 31, which will be hereinafter referred to more at length and which furnish a passage for exhaust-steam from the chamber 5. There are two diametrically oppositely located valve-chambers 6 and $6^a$, and the adjuncts of each of the two valves are alike, so that a description of one will suffice for both.

The valve-chamber 6 is an annular chamber located at one side of the center of the annular chamber 5 and arranged to cut the annular chamber 5 at two points. The external walls of the valve-chamber 6 are formed in part in an extension of the external wall of the annular chamber 5 and in part by the core $5^b$, through which a part of this annular chamber cuts. The internal wall of the chamber 6 is formed by a core-piece $6^b$, that lies across and is cut by the annular chamber 5. A valve 9, which is nearly a half-cylinder, is arranged to rotate in the chamber 6, and this valve 9 twice in each rotation lies across the annular chamber 5, and at the time it so lies across the chamber 5 it forms an abutment to confine the steam between it and the rotary piston 7. Cast integral with and forming one piece with the abutment 9 is a disk 22, which forms the end of that part of the chamber 5 which extends over the disk, the disk itself being concentric with and turning in a round opening in the casing or head 2ª, and the casing or head 2ª forms the head of the chamber 5 at all other parts except where the two valve-disks are inserted. The valve-disk is itself a part of a closure to an opening through the partition between a steam-chest 19 and the annular piston-chamber, the entire partition being composed of the two disks mentioned, a fixed diaphragm 27, and a rotating diaphragm 29. Through the fixed diaphragm 27 is a segmental opening 28 and a bearing 16ª for the valve stem or shaft, and through the rotating diaphragm 29 is a similar segmental opening 30, that registers once with the segmental opening 28 with each revolution of the shaft 16. The two disks 21 and 22 are each provided with a number of openings 25 26, at least one of which is always in position to discharge into the annular chamber 5; but steam passes into the annular chamber 5 only when the two openings 28 and 30 are in register. Thus the shaft 16 carries the rotating disk 29, which regulates the passage of steam. It also carries the rotating abutment 9. The shaft 16 passes through a suitable stuffing-box 20 on the steam-chest and on its protruding end is provided with a gear-wheel 15, that meshes with a gear-wheel 14 on the main shaft 10 of the engine, and the main shaft 10 has secured to it a disk 38, which forms the head, closing the annular piston-ring 8 at one end. The shaft 10 has an end-thrust bearing against a regulating cone-pointed screw 32, that engages through the sleeve 33, inserted in a screw-threaded opening through the end of the casing. The sleeve 33 is held to its place by a lock-nut 36. The cone-pointed screw 32 is also locked in the nipple 33 by a lock-nut 35. The end-thrust bearing, with its adjustment, enables the position of the shaft to be regulated to properly bring the ring 8 into engagement with the walls of the slot of the chamber 5, and this adjustment can be made to bring the parts into close relation or to relieve some of the bearing thrust from the ring-flanges, if that is found desirable.

The steam escapes from the chamber 5 through passages 31, that lead into the walls of the ring, and out through the sides thereof into the exhaust-chamber 3. Thence the exhaust is to the open air.

The steam is led into the steam-chest through pipes 43, of which there are two, one leading into each steam-chest.

Generally the piston-ring 8 is arranged to rest loosely in the slot of the partition-wall 37. The piston 7 is bolted to the piston-ring 8 and projects into the chamber 5, forming a complete abutment across it. It is shaped to conform to the ring-chamber, in which it travels, and is packed by means of the cross-shaft packing 40, pressed outward on springs 41. The plates 40 rest in grooves cut in the piston-head and bear against the walls of the chamber under the pressure of the springs 41. The rotating abutments 9 are packed in a similar way by plates 42, that rest in grooves and are pressed outward by springs 42ª.

The disks 21 and 22 are made separate and held together by a dovetailed groove and tongue in order that the disk 22 may have a very slight motion eccentric to the center of the disk, which will tend to keep it pressed tightly against the outer wall of the chamber in which it revolves. The disks 21, and 22 revolve together, and the holes through them are always in registry; but the disk 21 is always centric to the shaft 16, and the disk 22 is free to move across the face of the disk 21 within the limits of the chamber 6, in which it revolves.

The operation of the engine will be understood from reference to Figs. 3 and 4, taken in connection with Fig. 5. The steam passage-way from the steam-chest into the chamber 5 is open through the right-hand steam-chamber and closed through the left. The exit passage-ways 31 are all between the piston 7 and the left-hand abutment 9, and the steam can freely escape therethrough while it is entering through the passage-ways in front of the right-hand abutment as the piston advances in the direction of the arrow in Fig. 3. It passes the left-hand abutment 9, which rotates across the passage behind it, and opens the steam passage-way between this abutment and the piston, which is now approaching the position shown in Fig. 4, and the passage to the right-hand abutment has been closed. Thus the rotation of the parts is continuous, while the position of the abutments brings them alternately into action behind the piston and moves them out of position to allow the further rotation of the piston.

What I claim is—

1. In a rotary engine, in combination with an annular chamber provided with an annular groove, a ring engaging in said groove, a shaft adapted to be actuated by said ring, a piston secured to said ring and adapted to travel in said annular chamber, rotary abutments engaging in annular abutment-chambers which cut the main piston-chamber, a shaft for said rotary abutment and gearing between the main shaft and the abutment-shaft, substantially as described.

2. In a rotary engine, in combination with an annular piston-chamber, a piston adapted to travel therein, an annular abutment-chamber, and an abutment adapted to travel therein a shaft and connections, whereby the shaft is adapted to produce a travel of the abutment corresponding to that of the main shaft, means whereby the abutment is permitted to shift its center with respect to the center of its shaft, substantially as described.

3. In a rotary engine, in combination with an annular piston-chamber, a steam-chest, a disk-abutment holder provided with steam-passages, a perforated partition between the steam-chest and the chamber, a disk for closing said perforation, and means for rotating said disk, substantially as described.

4. In a rotary engine, in combination with an annular piston-chamber, a steam-chest, a disk-abutment holder provided with steam-passages, a perforated partition between the steam-chest and the chamber, a disk 29 closing said perforation, and means for rotating said disk, and a perforated disk 21 and means for rotating said disk in unison with the main shaft, substantially as described.

In testimony whereof I sign this specification in the presence of two witnesses.

WILLIAM M. HOFFMAN.

Witnesses:
PETER WAGNER,
D. M. JEFFERS.